(12) United States Patent
Ohmura et al.

(10) Patent No.: US 9,133,943 B2
(45) Date of Patent: Sep. 15, 2015

(54) FLOW PATH SWITCHING VALVE AND DISCHARGE CONTROL APPARATUS FOR FLUID MATERIAL USING THE SAME

(75) Inventors: Yuta Ohmura, Koganei (JP); Youhei Edagawa, Tokyo (JP); Susumu Murata, Tokyo (JP)

(73) Assignees: Koganei Corporation, Tokyo (JP); Canon Kabushiki, Tokyo (JP)

( * ) Notice: Subject to any disclaimer, the term of this patent is extended or adjusted under 35 U.S.C. 154(b) by 0 days.

(21) Appl. No.: 13/602,806

(22) Filed: Sep. 4, 2012

(65) Prior Publication Data

US 2013/0068330 A1   Mar. 21, 2013

(30) Foreign Application Priority Data

Sep. 5, 2011 (JP) .................................. 2011-192486

(51) Int. Cl.
| | |
|---|---|
| *G01F 11/00* | (2006.01) |
| *F16K 11/056* | (2006.01) |
| *F16K 11/07* | (2006.01) |
| *B05C 5/02* | (2006.01) |

(52) U.S. Cl.
CPC ........... *F16K 11/0565* (2013.01); *B05C 5/0225* (2013.01); *F16K 11/07* (2013.01); *Y10T 137/86549* (2015.04); *Y10T 137/86879* (2015.04)

(58) Field of Classification Search
CPC .......... B05C 5/02–5/0229; F16K 11/02–11/07
USPC ......... 222/309, 380, 382, 385, 372, 373, 394, 222/396, 397, 398, 399; 417/567, 568; 251/333, 334; 137/512, 512.4, 843, 137/493.9, 102; 604/247
See application file for complete search history.

(56) References Cited

U.S. PATENT DOCUMENTS

| | | | | | |
|---|---|---|---|---|---|
| 3,086,542 | A | * | 4/1963 | Mosier | 137/102 |
| 3,270,771 | A | * | 9/1966 | Luke et al. | 137/859 |
| 3,419,031 | A | * | 12/1968 | Holger et al. | 137/102 |
| 3,460,558 | A | * | 8/1969 | Johannisson | 137/102 |
| 4,006,847 | A | * | 2/1977 | Dooley | 222/263 |
| 4,084,606 | A | * | 4/1978 | Mittleman | 137/102 |
| 4,235,265 | A | * | 11/1980 | Feliks | 141/85 |
| 4,239,038 | A | * | 12/1980 | Holmes | 128/205.13 |
| 4,246,932 | A | * | 1/1981 | Raines | 137/512 |

(Continued)

FOREIGN PATENT DOCUMENTS

| | | |
|---|---|---|
| JP | 62-190171 | 12/1987 |
| JP | 62-190171 U | 12/1987 |

(Continued)

*Primary Examiner* — Patrick M Buechner
*Assistant Examiner* — Randall Gruby
(74) *Attorney, Agent, or Firm* — McCormick, Paulding & Huber LLP (57) ABSTRACT

A flow path switching valve has an injection side portion formed with an injection chamber and an outer valve seating surface, and a discharge side portion provided with a partition member formed with an inner valve seating surface. A discharge control block communicating with a discharge chamber is formed with a control flow path which is increased and decreased in volume by a discharge rod. To fill the control flow path with grease, a valve element closes an inner flow path and opens an outer flow path. On the other hand, to discharge the grease in the control flow path to the discharge chamber, the valve element closes the outer flow path and opens the inner flow path. After being supplied to the control flow path, the grease is supplied to the discharge chamber.

1 Claim, 5 Drawing Sheets

(56) References Cited

U.S. PATENT DOCUMENTS

| | | | |
|---|---|---|---|
| 4,254,806 A * | 3/1981 | Elsworth | 141/116 |
| 4,305,531 A * | 12/1981 | Dooley et al. | 222/334 |
| 4,438,872 A * | 3/1984 | Dooley et al. | 222/217 |
| 4,456,152 A * | 6/1984 | Young et al. | 222/309 |
| 4,457,330 A * | 7/1984 | Fields | 137/102 |
| 4,485,971 A * | 12/1984 | Pajevic | 239/289 |
| 4,634,027 A * | 1/1987 | Kanarvogel | 222/380 |
| 4,666,429 A * | 5/1987 | Stone | 604/83 |
| 4,793,524 A * | 12/1988 | Starr | 222/309 |
| 4,869,404 A * | 9/1989 | Elliott | 222/385 |
| 4,905,744 A * | 3/1990 | Siegrest et al. | 141/258 |
| 5,038,814 A * | 8/1991 | Gayton et al. | 137/218 |
| 5,054,656 A * | 10/1991 | Lasner | 222/158 |
| 5,098,405 A * | 3/1992 | Peterson et al. | 604/247 |
| 5,176,658 A * | 1/1993 | Ranford | 604/247 |
| 5,205,439 A * | 4/1993 | Sturm | 222/1 |
| 5,295,478 A * | 3/1994 | Baldwin | 128/203.11 |
| 5,305,777 A * | 4/1994 | Nakamura et al. | 137/102 |
| 5,320,250 A * | 6/1994 | La et al. | 222/1 |
| 5,360,413 A * | 11/1994 | Leason et al. | 604/249 |
| 5,375,746 A * | 12/1994 | Schaefer et al. | 222/385 |
| 5,407,102 A * | 4/1995 | Freudinger et al. | 222/309 |
| 5,579,959 A * | 12/1996 | Bennett et al. | 222/385 |
| 5,738,662 A * | 4/1998 | Shannon et al. | 604/247 |
| 5,749,358 A * | 5/1998 | Good et al. | 128/205.23 |
| 6,085,773 A * | 7/2000 | Karg et al. | 137/102 |
| 6,098,849 A * | 8/2000 | McInnes | 222/175 |
| 6,183,223 B1 * | 2/2001 | Yajima | 417/478 |
| 6,220,487 B1 * | 4/2001 | Srivastava et al. | 222/380 |
| 6,253,957 B1 * | 7/2001 | Messerly et al. | 222/1 |
| 6,290,682 B1 * | 9/2001 | Myers | 604/247 |
| 6,378,574 B2 * | 4/2002 | Tsutsui | 141/146 |
| 6,378,737 B1 * | 4/2002 | Cavallaro et al. | 222/309 |
| 6,378,740 B1 * | 4/2002 | Martin | 222/389 |
| 6,422,434 B1 * | 7/2002 | Lammond Wass et al. | 222/571 |
| 6,453,940 B1 * | 9/2002 | Tipton et al. | 137/493.9 |
| 6,576,295 B2 * | 6/2003 | Tisone | 427/256 |
| 6,708,714 B1 * | 3/2004 | Mijers | 137/102 |
| 6,736,613 B2 * | 5/2004 | Nagata | 417/415 |
| 6,814,109 B2 * | 11/2004 | Rohret et al. | 141/89 |
| 6,953,450 B2 * | 10/2005 | Baldwin et al. | 604/248 |
| 6,983,867 B1 * | 1/2006 | Fugere | 222/413 |
| 7,216,782 B2 * | 5/2007 | Sugimura et al. | 222/260 |
| 7,377,758 B2 * | 5/2008 | Sallows et al. | 417/568 |
| 7,484,642 B2 * | 2/2009 | Bonney | 222/256 |
| 7,621,429 B2 * | 11/2009 | Wu et al. | 222/389 |
| 7,793,804 B2 * | 9/2010 | McGiveron | 222/385 |
| 8,337,470 B2 * | 12/2012 | Prasad et al. | 604/247 |
| 8,640,725 B2 * | 2/2014 | Truitt et al. | 137/1 |
| 8,690,870 B2 * | 4/2014 | Wang et al. | 606/41 |
| 8,708,246 B2 * | 4/2014 | Dunlap et al. | 239/1 |
| 8,915,722 B1 * | 12/2014 | Blume | 417/454 |
| 2002/0036211 A1 * | 3/2002 | Seltzer | 222/108 |
| 2002/0112821 A1 * | 8/2002 | Inaba et al. | 156/359 |
| 2005/0184101 A1 * | 8/2005 | Masuda | 222/380 |
| 2008/0138214 A1 * | 6/2008 | Yajima | 417/246 |
| 2009/0071974 A1 * | 3/2009 | Ikushima | 222/1 |
| 2010/0252576 A1 * | 10/2010 | Fiske et al. | 222/146.1 |
| 2011/0042418 A1 * | 2/2011 | Lambrecht | 222/152 |
| 2012/0217262 A1 * | 8/2012 | Ikushima | 222/1 |
| 2013/0048759 A1 * | 2/2013 | Aguilar et al. | 239/562 |
| 2013/0068330 A1 * | 3/2013 | Ohmura et al. | 137/625.17 |

FOREIGN PATENT DOCUMENTS

| | | | |
|---|---|---|---|
| JP | 2788809 | * | 6/1991 |
| JP | 2002-147625 A | | 5/2002 |
| JP | 2003-137398 A | | 5/2003 |
| WO | 2011037139 | * | 3/2011 |

* cited by examiner

FLOW PATH SWITCHING VALVE AND DISCHARGE CONTROL APPARATUS FOR FLUID MATERIAL USING THE SAME

CROSS-REFERENCE TO RELATED APPLICATION

The present application claims priority from Japanese Patent Application No. 2011-192486 filed on Sep. 5, 2011, the content of which is hereby incorporated by reference into this application.

TECHNICAL FIELD OF THE INVENTION

The present invention relates to a flow path switching valve provided in a feeding flow path for supplying a fluid material such as grease and liquid to a dispenser, and a discharge control apparatus using the same.

BACKGROUND OF THE INVENTION

It is well-known that lubricating oil such as grease may be applied to electric products and machine parts as a member to which lubricating oil such as grease is applied. On the other hand, in a process of manufacturing electronic parts, liquid such as chemical may be applied to a member to be manufactured. A discharge apparatus is usually used to discharge an incompressible fluid material such as lubricating oil and liquid to an object. The discharge apparatus is arranged and used between a discharge nozzle and a container having a fluid material accommodated therein. In some conventional cases, a discharge apparatus may be provided with a solenoid valve for switching a flow path; however, since the discharge apparatus includes a member such as a solenoid valve, the discharge apparatus is heavy and complicated. For this reason, the conventional discharge apparatus uses a drive unit for movement in two axial directions of X and Y, or the conventional discharge apparatus is fixed to a mounting pedestal and the object is moved.

In some discharge apparatuses, a pump member is elastically deformed for pumping operation; however, the discharge apparatus of this type also has a complicated structure. A conventional discharge apparatus having a pump member which is elastically deformed, such as a diaphragm, is appropriate for the case where the discharge amount is relatively large, but it is difficult to control the discharge amount with high precision to apply a small amount of fluid material equal to or not more than 1 g to the member to which the fluid material is applied.

The application quantity of the fluid material to electric products or machine parts differ depending on a member to which the relevant fluid material is applied, and as described above, the application quantity of the fluid material may be equal to or not more than 1 g, but more fluid material may be applied.

In order to supply the fluid material, such as lubricating oil, to a dispenser with high precision, the inventor devised a discharge apparatus having a structure to fill a control flow path with fluid material from a container, and discharge the fluid material to the dispenser from the control flow path. For achieving such a discharge apparatus, the control flow path diverges from the guide flow path between a discharge nozzle and the container having the fluid material accommodated therein; therefore, a three-way valve is used as a flow path switching valve. Japanese Patent Laid-Open Publication No. 2002-147625 discloses a three-way valve for switching the flow path.

As disclosed in Japanese Patent Laid-Open Publication No. 2002-147625, in the three-way valve having a spherical valve element, since the valve element is moved along a guide groove formed in a valve case, the valve element moves over a long distance to perform an opening/closing operation in a port. For this reason, the three-way valve has a response lag between when the port should be opened/closed and when the valve element actually finishes opening or closing the port. Since this causes the liquid to drip from the discharge nozzle, it is necessary to suck it back, and since the amount of the liquid flowing through the flow path is large, it is difficult to guide the controlled amount of liquid (slight quantity) from a flow path to another flow path.

It is an object of the present invention to provide a flow path switching valve and a discharge control apparatus which can control the discharge amount of a fluid material such as grease with high precision without causing it to drip, or without the need to suck it back, and has excellent sealing property and responsibility.

SUMMARY OF THE INVENTION

A flow path switching valve according to the present invention for switching a guide flow path for guiding a fluid material to a dispenser, comprised: an injection chamber to which the fluid material pressurized by a compressed air is supplied, and an outer valve seating surface which is cylindrical and continuous from the injection chamber; a partition member which is cylindrical and arranged on the inside of the outer valve seating surface in a radial direction, and partitions an internal space into a discharge chamber formed on the inside of the partition member and an annular feed chamber formed on the outside of the partition member; an inner valve seating surface provided to the tip side portion of the partition member, wherein a valve chamber is formed between the inner valve seating surface and the outer valve seating surface; a discharge control block formed with a control flow path which is connected to the feed chamber, wherein the volume of the control flow path is changed by a discharge rod; and a valve element having a base portion which is arranged in the valve chamber, and opens and closes an inner flow path formed between the inner valve seating surface and the base portion of the valve element, and an annular flange portion which is integrally formed with the base portion, and opens and closes an outer flow path formed between the annular flange portion and the outer valve seating surface with elastic deformation, wherein the flow path switching valve performs: a filling operation in which the annular flange portion elastically deforms and separates from the outer valve seating surface to flow the fluid material into the control flow path from the injection chamber, and the base portion abuts on the inner valve seating surface to stop the flow of the fluid material to the discharge chamber; a balance operation in which the elastic deformation of the annular flange portion is restored to be in contact with the outer valve seating surface and closes the outer flow path; and a discharge operation in which when the discharge rod shrinks the volume in the control flow path and the pressure in the control flow path becomes higher than the pressure in the injection chamber, the base portion of the valve element separates from the inner valve seating surface, discharges the fluid material from the control flow path to the discharge chamber.

A discharge control apparatus according to the present invention for discharging a fluid material to a dispenser, the discharge control apparatus comprised: an injection chamber to which the fluid material pressurized by a compressed air is supplied, and an outer valve seating surface which is cylindrical and continuous from the injection chamber; a partition member which is cylindrical and arranged on the inside of the outer valve seating surface in a radial direction, and partitions an internal space into a discharge chamber formed on the inside of the partition member and an annular feed chamber formed on the outside of the partition member; an inner valve seating surface provided to the tip side portion of the partition member, wherein a valve chamber is formed between the inner valve seating surface and the outer valve seating surface; a discharge control block formed with a control flow path which is connected to the feed chamber, wherein the volume of the control flow path is changed by a discharge rod; discharging means provided to the discharge control block to reciprocate the discharge rod; and a valve element having a base portion which is arranged in the valve chamber, and opens and closes an inner flow path formed between the inner valve seating surface and the base portion of the valve element, and an annular flange portion which is integrally formed with the base portion, and opens and closes an outer flow path formed between the annular flange portion and the outer valve seating surface with elastic deformation, wherein discharge control apparatus performs: a filling operation in which the annular flange portion elastically deforms and separates from the outer valve seating surface to flow the fluid material into the control flow path from the injection chamber, and the base portion abuts on the inner valve seating surface to stop the flow of the fluid material to the discharge chamber; a balance operation in which the elastic deformation of the annular flange portion is restored to be in contact with the outer valve seating surface and closes the outer flow path; and a discharge operation in which when the discharge rod shrinks the volume in the control flow path and the pressure in the control flow path becomes higher than the pressure in the injection chamber, the base portion of the valve element separates from the inner valve seating surface, discharges the fluid material from the control flow path to the discharge chamber.

In the discharge control apparatus according to the present invention, the discharging means has a driving case in which the discharge rod is accommodated reciprocably, wherein the discharge rod is inserted into the control flow path with the discharge control block being arranged while allowing the control flow path filled with the fluid material to face in an upper direction, and the driving case is attached to the discharge control block with the fluid material being overflowed from the control flow path. In the discharge control apparatus according to the present invention, wherein the discharging means has: a driving rod for driving the discharge rod; and a driving case in which the driving rod is accommodated and reciprocable in the axial direction, wherein a stroke adjusting member for adjusting a stroke of the driving rod is provided in the driving case.

The flow path switching valve of the present invention performs a filling operation to connect a primary side to a control flow path, and block the control flow path from a secondary side flow path when the pressure of the primary side is higher than that of the control flow path side. When the pressure of the primary side becomes equal to that of the control flow path side, a balance is kept by blocking the primary side from the control flow path and blocking the control flow path from the secondary side. When the pressure of the control flow path side becomes higher than that of the primary side, it performs a discharge operation by connecting the control flow path to the secondary side while blocking the primary side from the control flow path. Especially, when shifting from the balanced state to the discharge operation, if the pressure of the control flow path side becomes slightly higher than that of the primary side, a base portion of a valve element releases an inner valve seating surface. Therefore, it is possible to discharge the fluid material to the secondary side in response to a slight volume change of the control flow path.

In the flow path switching valve according to the present invention, since the movement of the valve element in shifting to a discharge operation from a state of balance is extremely small, even when the discharge amount is small, the discharge accuracy can be set with high precision.

Since the discharge control apparatus of the present invention has a small and highly sensitive flow path switching valve, the discharge control apparatus can be reduced in size and weight, and an operator may manually discharge the fluid material to the member to be supplied without automatically moving the grease discharge apparatus by using shifting means.

DESCRIPTIONS OF THE PREFERRED EMBODIMENTS

Figure 1:
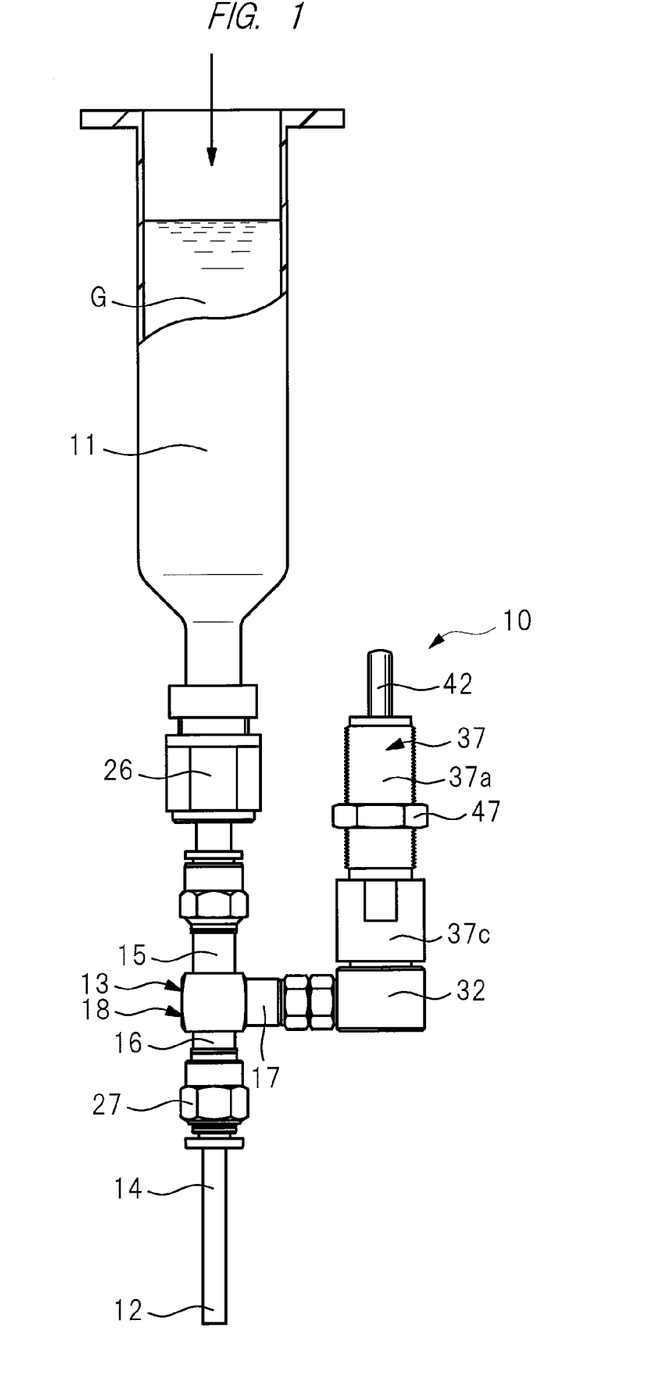
FIG. 1 is a front view showing a grease discharge apparatus.

Hereinafter, an embodiment of the present invention will be described in detail with reference to the drawings. A grease discharge apparatus 10 shown in FIG. 1 is used to supply grease "G" as a fluid material accommodated in a storage container 11 to a discharge nozzle 12 as a dispenser. The storage container 11 called a syringe is removably connected to a primary side of a flow path switching valve 13, and the tip of a discharge pipe 14 connected to a secondary side of the flow path switching valve 13 serves as the discharge nozzle 12.

Figure 2:
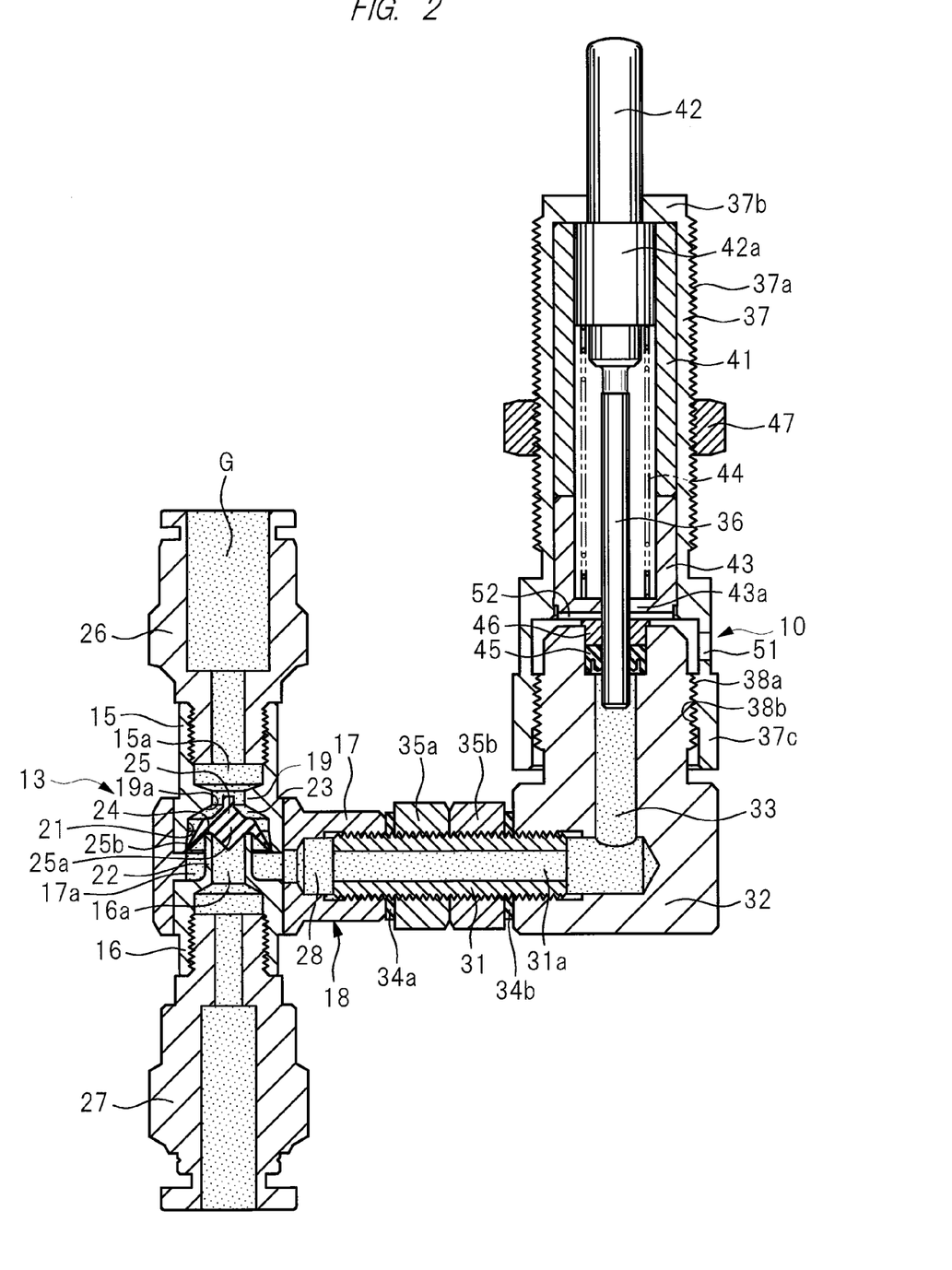
FIG. 2 is an enlarged sectional view partially showing the apparatus of FIG. 1.

As shown in FIG. 2, the flow path switching valve 13 has a cylindrical injection side portion 15 and a cylindrical discharge side portion 16, and each of the cylindrical injection side portion 15 and the cylindrical discharge side portion 16 is formed with a guide flow path for guiding the grease "G". The cylindrical injection side portion 15 and the cylindrical discharge side portion 16 are almost the same in diameter as each other, and fitted into a mounting hole formed in a joint portion 17 so that they are attached to the joint portion 17 in coaxial relationship with each other. In the flow path switching valve 13 shown in FIG. 2, a valve case 18 is composed of a combination of the cylindrical injection side portion 15, the cylindrical discharge side portion 16, and the joint portion 17. However, the valve case 18 having these portions may be integrally formed, or for example, the cylindrical discharge side portion 16 and the joint portion 17 may be integrally formed.

The injection side portion 15 is formed with an injection chamber 15a, and the grease "G" is supplied from the storage container 11 to this injection chamber 15a. The discharge side portion 16 is formed with a discharge chamber 16a, and this discharge chamber 16a communicates with the discharge nozzle 12.

The injection side portion 15 is formed with a cylindrical outer valve seating surface 21 which serves as a valve seating surface, and which is continuous from the injection chamber 15a via a constricted portion 19. The discharge side portion 16 is formed with a cylindrical partition member 22 which is arranged on the radially-inner side of the outer valve seating surface 21. This partition member 22 has a tip side portion received in the injection side portion 15, and faces the outer valve seating surface 21 in its radial direction. The partition member 22 partitions an internal space into the discharge chamber 16a formed on the inside thereof and an annular feed chamber 17a formed on the outside thereof, and a valve chamber 23 is formed between the partition member 22 and the outer valve seating surface 21. The valve chamber 23 is continuous from the feed chamber 17a, and communicates with the injection chamber 15a.

An open end surface formed at the tip of the partition member 22 serves as an inner valve seating surface 24 in its radial direction. In the valve chamber 23, a tapered surface 19a is provided between the constricted portion 19 and the outer valve seating surface 21, and the inner valve seating surface 24 faces the tapered surface 19a across the valve chamber 23.

A valve element 25 is arranged in the valve chamber 23, and the valve element 25 has a base portion 25a as a center section, and an annular flange portion 25b formed on the outside of the base portion 25a, the valve element 25 being integrally formed of rubber material. The base portion 25a performs an opening and closing operation with the inner valve seating surface 24 by moving between two positions, so that the base portion 25a abuts on the inner valve seating surface 24 at one position, and away from the inner valve seating surface 24 at the other position, and the annular flange portion 25b performs an opening and closing operation by elastic deformation.

The outer valve seating surface 21 and the cylindrical partition member 22 are arranged in coaxial relationship with each other. Therefore, the inner valve seating surface 24 provided on the tip side portion of the partition member 22 is also in coaxial relationship with the outer valve seating surface 21. The valve element 25 is axially symmetrical in shape as shown in FIGS. 2, and 3A to 3C, and arranged in coaxial relationship with the outer valve seating surface 21, the cylindrical partition member 22, and the inner valve seating surface 24. This coaxial arrangement allows the annular flange portion 25b and the base portion 25a of the valve element 25 to reliably close the outer valve seating surface 21 and the inner valve seating surface 24, respectively.

The injection side portion 15 of the flow path switching valve 13 is attached with a holder 26 to which the storage container 11 is removably attached. On the other hand, the discharge side portion 16 is attached with a connector 27 to which the discharge pipe 14 of the discharge nozzle 12 is connected.

The joint portion 17 constituting the valve case 18 of the flow path switching valve 13 is formed with a communication hole 28 which communicates with the annular feed chamber 17a on the outside of the partition member 22, and this communication hole 28 has a central axis perpendicular to that of the feed chamber 17a, and that of the discharge chamber 16a. One end of a communication pipe 31 is screwed to the joint portion 17, and the other end of the communication pipe 31 is screwed to a discharge control block 32. The discharge control block 32 is connected to the valve case 18 via the communication pipe 31. A control flow path 33 extending in a direction parallel to the injection side portion 15 is formed in the discharge control block 32, and the grease "G" in the storage container 11 is filled in this control flow path 33 via the injection chamber 15a, the valve chamber 23, the feed chamber 17a, the communication hole 28, and a through hole 31a in the communication pipe 31. A seal member 34a is fastened to the end face of the joint portion 17 with a nut 35a to seal a gap between the communication pipe 31 and the joint portion 17. A seal member 34b is fastened to the end face of the discharge control block 32 with a nut 35b to seal a gap between the communication pipe 31 and the discharge control block 32.

To fill the control flow path 33 with the grease "G" in the storage container 11 and supply the grease "G" to the discharge nozzle 12 from the control flow path 33 via the discharge chamber 16a, the discharge control block 32 is provided with a discharge rod 36 which reciprocates in the control flow path 33. This discharge rod 36 is incorporated in the driving case 37 attached to the discharge control block 32.

The driving case 37 has a cylindrical portion 37a, a bottom wall portion 37b on the base end side of the cylindrical portion 37a, and a cylindrical mounting portion 37c on the tip end side of the cylindrical portion 37a. The cylindrical mounting portion 37c is provided with a female thread 38b screwed to a male thread 38a of the discharge control block 32. A slide member 42a is inserted in a sleeve 41 provided in the cylindrical portion 37a and reciprocable in its axial direction, and one end portion of this slide member 42a is provided with a driving rod 42 which projects outside from the bottom wall portion 37b of the driving case 37. The discharge rod 36 is provided to the slide member 42a, and when driving the driving rod 42 in its axial direction, the discharge rod 36 is driven in the axial direction. In this way, the driving rod 42 and the driving case 37 in which this rod is reciprocably accommodated serve as discharging means which reciprocates the discharge rod 36. A cover 43 is incorporated in the tip end portion of the driving case 37, and the discharge rod 36 penetrates an end wall portion 43a of the cover 43 and is received in the control flow path 33 of the discharge control block 32.

A helical compression spring 44 is provided between the end wall portion 43a of the cover 43 and the slide member 42a. A spring force in a reverse direction away from the control flow path 33 is added to the discharge rod 36 by a spring member composed of this helical compression spring 44. When the discharge rod 36 moves back so as to be retracted from the control flow path 33 and accommodated in the driving case 37, the volume of the control flow path 33 is expanded. On the other hand, when the discharge rod 36 moves against the spring force so as to be inserted into the control flow path 33, the volume of the control flow path 33 is reduced. The discharge control block 32 is provided with a sealant 45 for sealing a gap between the discharge rod 36 and the discharge control blocks 32, and the sealant 45 is prevented from falling off by a stop ring 46.

To perform an application operation of the grease "G" to the object by using the above-mentioned grease discharge apparatus 10, the grease discharge apparatus 10 may be installed to a supporting stand (not shown) movable in two axial directions of X and Y, or the grease "G" may be applied by the grease discharge apparatus 10 installed to the fixed supporting stand by moving the object. Furthermore, the operator may hold the grease discharge apparatus 10 in hand to perform an application operation of the grease "G" to the object.

To attach the grease discharge apparatus 10 to the supporting stand, a nut 47 is attached to the male thread portion of the cylindrical portion 37a of the driving case 37, and the grease discharge apparatus 10 is attached to the supporting stand with a bracket (not shown) which is fixed by this nut 47. To ensure that the grease "G" in the storage container 11 is reliably supplied to the injection chamber 15a, compressed air is supplied from the top of the storage container 11 as shown by the arrow in FIG. 1.

(Filling Operation)

Figure 3A:
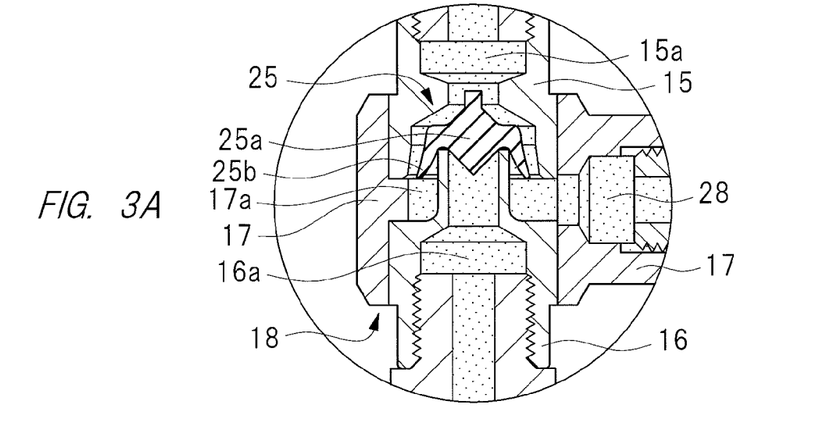
FIG. 3A to 3C are partially-enlarged sectional views showing open and closed states of a valve element shown in FIG. 2.

To apply the grease "G" to the object from the discharge nozzle 12 by using the above-mentioned grease discharge apparatus 10, the driving rod 42 is firstly pushed down to the lower end so that the discharge rod 36 is completely accommodated in the control flow path 33, and it starts from this state to fill the control flow path 33 with the grease "G" in the storage container 11. The filling operation is performed by moving the discharge rod 36 back with the helical compression spring 44 to expand the volume of the control flow path 33. Furthermore, when the diameter of the discharge rod 36 is large, the discharge rod 36 moves back so as to perform the following filling operation with the pressure of the compressed air applied to the grease "G" in the storage container 11 even if there is no helical compression spring 44. In this filling operation, since the pressure from the injection chamber 15a to the valve chamber 23 is higher than the pressure from the communication hole 28 to the control flow path 33, as shown in FIG. 3A, the base portion 25a of the valve element 25 closes an inner flow path formed between the inner valve seating surface 24 and the base portion 25a of the valve element 25 by coming into close contact with the inner valve seating surface 24, in other words, the base portion 25a abuts on the inner valve seating surface 24 to stop the flow of the fluid material to the discharge chamber 16a, and the annular flange portion 25b opens an outer flow path formed between the annular flange portion 25b and the outer valve seating surface 21 by elastically deforming and separating from the outer valve seating surface 21. In the filling operation of the grease "G" to the control flow path 33, since the pressure of the compressed air is applied in the storage container 11, the amount of the grease "G" corresponding to the filling stroke of the discharge rod 36 is filled in the control flow path 33.

(Balance Operation)

In this condition, when the discharge rod 36 moves back to its backward limit position and stops, the pressure of the injection chamber 15a comes into balance with that of the feed chamber 17a. In this balanced state, the annular flange portion 25b performs a balance operation to return to its original shape with its elastic force to come into close contact with the outer valve seating surface 21, and to close the outer flow path. FIG. 2 shows the balanced state in which the discharge rod 36 is driven to the backward limit position, and finishes filling the control flow path 33 with the grease "G".

(Discharge Operation)

Next, to discharge and feed the grease "G" in the control flow path 33 toward the discharge nozzle 12, the discharge rod 36 is moved forward to reduce the volume of the control flow path 33. When the grease discharge apparatus 10 is automatically driven, the driving rod 42 is moved forward by a reciprocating mechanism such as pneumatic cylinder (not shown). On the other hand, when an operator manually operates the grease discharge apparatus 10, the supply operation is performed by manually pushing the driving rod 42. In each driving method, the amount of the grease "G" to be supplied from the control flow path 33 is decided by the forward movement stroke of the driving rod 42.

When the discharge rod 36 is moved forward to perform the supply operation, since the pressure of the grease "G" in the control flow path 33 applied by the discharge rod 36 becomes higher than that of the grease "G" in the injection chamber 15a, the annular flange portion 25b of the valve element 25 comes into close contact with the outer valve seating surface 21 to maintain its closed state. On the other hand, the valve element 25 slightly moves toward the injection chamber 15a while sliding the annular flange portion 25b on the outer valve seating surface 21. With this movement, the base portion 25a slightly separates from the inner valve seating surface 24, and opens the inner flow path. Therefore, the grease "G" in the control flow path 33 is discharged from the discharge nozzle 12 to the object through the discharge chamber 16a, the connector 27, and the discharge pipe 14.

Figure 3B:
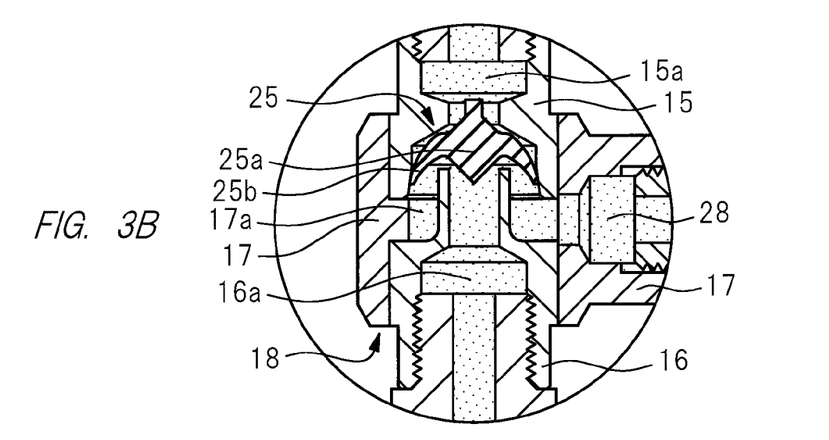
Figure 3C:
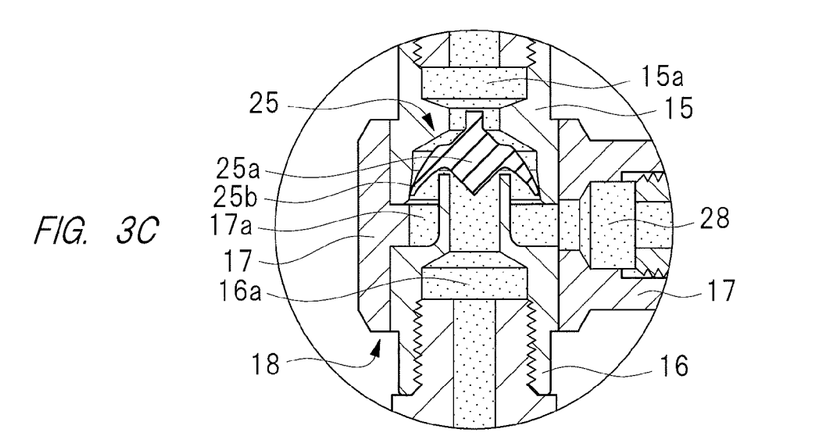

FIGS. 3B and 3C show the open and closed states of the valve element 25 at the time of performing a grease supply operation for discharging the grease from the discharge nozzle 12. The degree of an open state of the base portion 25a of the valve element 25, that is, the clearance between the base portion 25a and the inner valve seating surface 24 changes in response to the flow rate of the grease "G" supplied to the discharge chamber 16a from the control flow path 33 with the outer valve seating surface 21 closed by the elastic restoring force of the annular flange portion 25b. FIG. 3B shows a case where the flow rate of the grease "G" which is supplied to the discharge nozzle 12 from the control flow path 33 is relatively fast, and FIG. 3C shows the case where the flow rate of the grease "G" is supplied is relatively slow. Therefore, since the valve element 25 has the base portion 25a for opening and closing the inner valve seating surface 24 with the axial movement, and the annular flange portion 25b for opening and closing the outer valve seating surface 21 with the elastic deformation and elastic restoration and being in sliding contact with the outer valve seating surface 21 according to the opening of the base portion 25a, even when the discharge flow rate of the grease "G" is slow, the amount of grease "G" according to the supply operation stroke of the discharge rod 36 can be supplied to the discharge nozzle 12.

When the control flow path 33 is filled with the grease "G" in the storage container 11, the discharge rod 36 is moved back by the spring force of the helical compression spring 44. In this backward movement, since a pressure in a filling direction is applied to the grease "G" in the injection chamber 15a by the pressure of the compressed air applied to the injection chamber 15a, it is possible to move the discharge rod 36 to the backward limit position without having a larger spring force.

Figure 4:
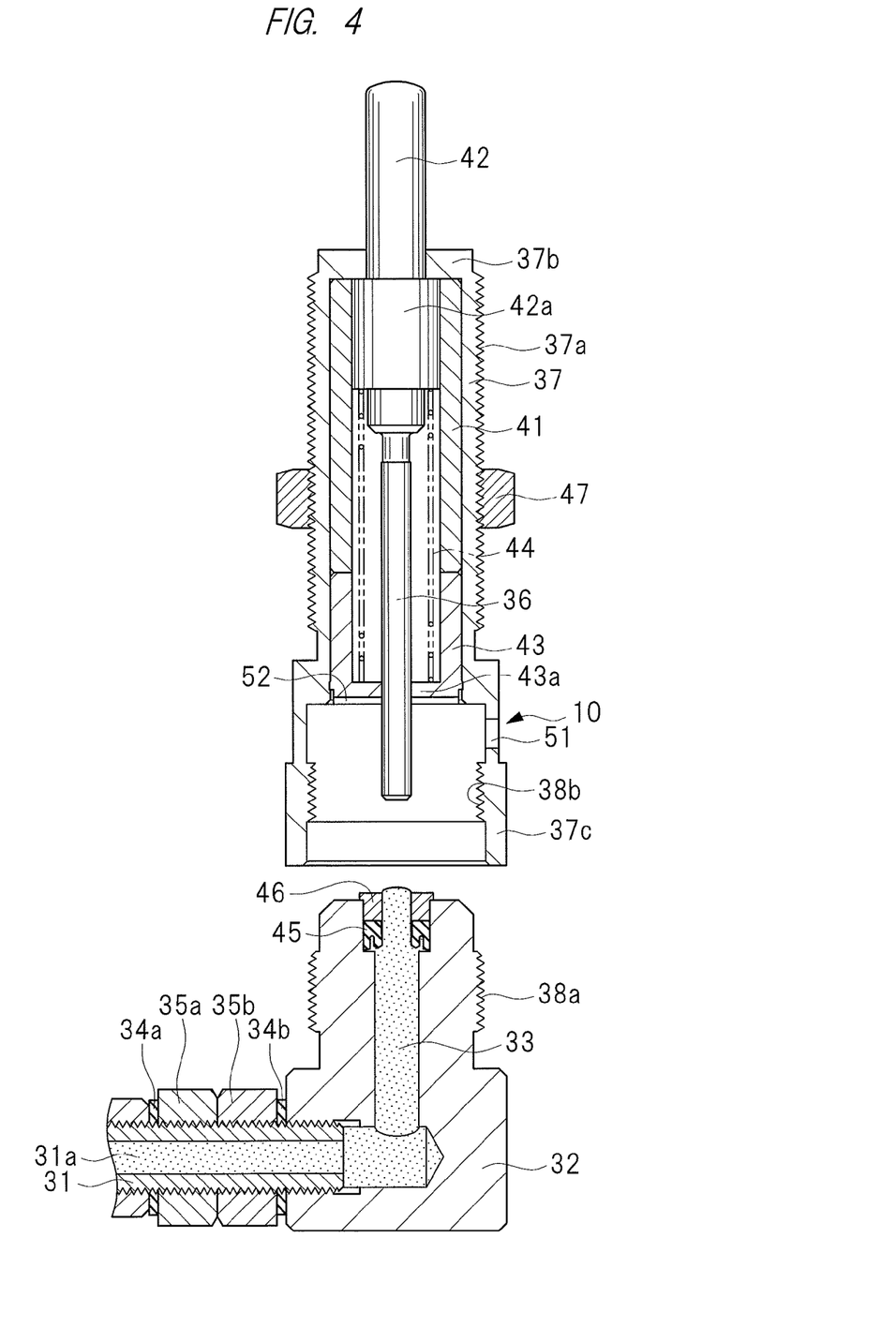
FIG. 4 is a partially-omitted cross-sectional view showing an assembling procedure of the grease discharge apparatus.

The discharge rod 36 is incorporated in the driving case 37. The driving case 37 incorporated with the discharge rod 36 can be attached to the discharge control block 32 by screwing the female thread 38b of the cylindrical mounting portion 37c of the driving case 37 to the male thread 38a of the discharge control block 32. FIG. 4 shows a state before attaching the driving case 37 to the discharge control block 32, and the female thread 38b of the cylindrical mounting portion 37c is screwed to the male thread 38a with the control flow path 33 filled with the grease "G" via the through hole 31a of the communication pipe 31. More specifically, when using the grease discharge apparatus 10 for the first time, the storage container 11 is attached to the holder 26 with the control flow path 33 facing in an upper direction. At this point, the driving case 37 is not attached to the control flow path 33. The grease "G" is supplied to the injection chamber 15a with slightly compressed air so as to be filled up to the valve case 18, the communication pipe 31, the sealant 45, and the stop ring 46. It is preferable that the grease "G" be raised slightly higher than the stop ring 46. The discharge rod 36 is inserted into the control flow path 33, and the driving case 37 is attached to the discharge control block 32 with the fluid material being overflowed from the control flow path. With this state, air in these elements is discharged from the mouth of the stop ring 46 to the outside to finish discharging air. If the driving case 37 is attached after bleeding the air, as shown in FIG. 4, since the discharge rod 36 enters the grease "G" slightly raised higher than the stop ring 46, air does not enter in the control flow path 33.

The cylindrical mounting portion 37c is formed with an exhaust hole 51 for discharge air in the cylindrical mounting portion 37c, that is, the female thread 38b, when the cylindrical mounting portion 37c is attached to the discharge control block 32. Furthermore, the end wall portion 43a of the cover 43 is formed in a radial direction with an exhaust guide groove 52 for guiding air to be discharged. In this way, when the driving case 37 is attached to the discharge control block 32, since the exhaust hole 51 is formed in the cylindrical mounting portion 37c, and the exhaust guide groove 52 is formed in the external surface of the end wall portion 43a, it is possible to prevent air from entering the control flow path 33. Furthermore, since the discharge rod 36 is retracted by the helical compression spring 44, this operation can be easily performed.

Figure 5:
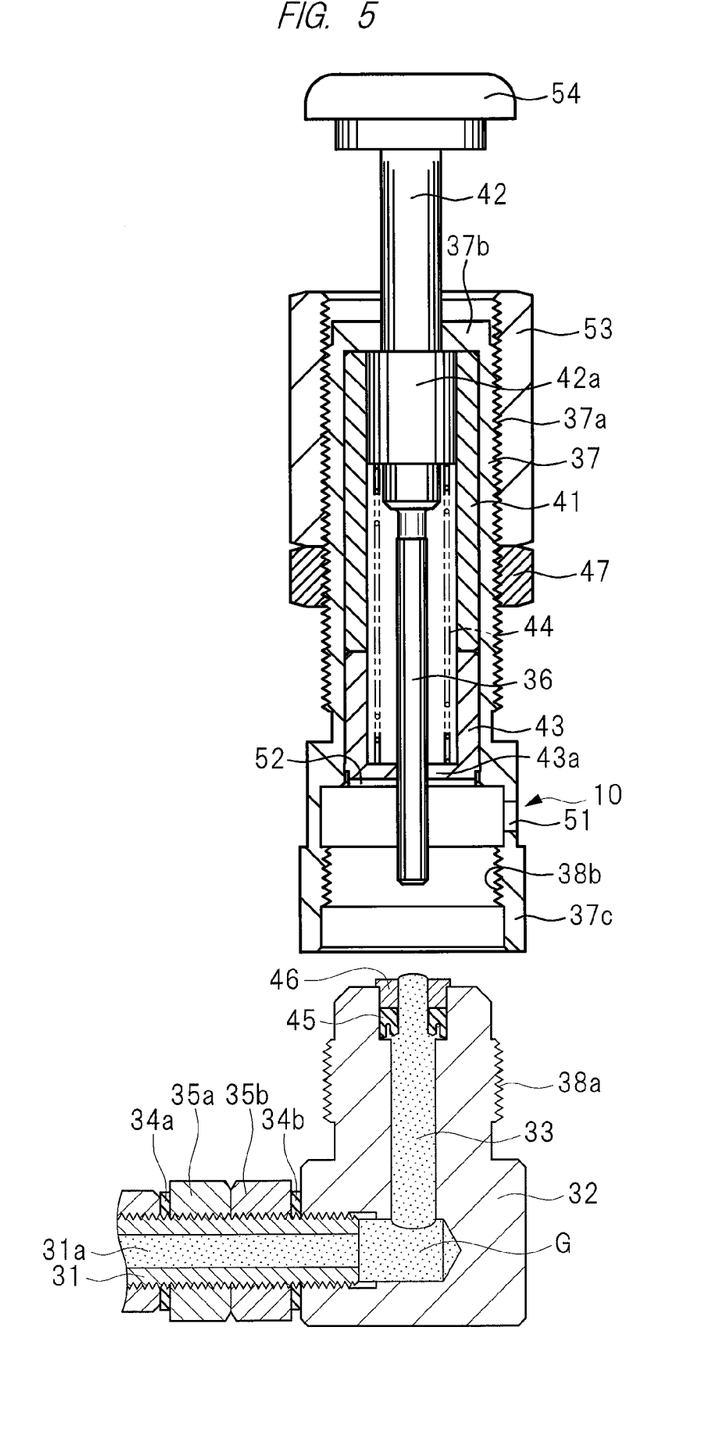
FIG. 5 is a partially-omitted cross-sectional view showing a modification of the grease discharge apparatus.

FIG. 5 is a cross-sectional view partially showing a modification of the grease dispenser, and portions shown in FIG. 5 correspond to those of the grease dispenser shown in FIG. 4.

In this discharge apparatus, a cylindrical stroke adjusting member 53 is screwed to the male thread of the cylindrical portion 37a of the driving case 37. It is possible to arbitrarily adjust the position of the stroke adjusting member 53 in the axial direction of the driving case 37 by rotation of the stroke adjusting member 53, and when the nut 47 is screwed tight to the stroke adjusting member 53, the stroke adjusting member 53 is fixed at a given position. The driving rod 42 is provided with a stopper 54 which has a large diameter to abut on the stroke adjusting member 53. The reciprocation stroke of the driving rod 42 is set by the distance between the end face of the stroke adjusting member 53 and the stopper 54, and the reciprocation stroke of the driving rod 42 sets the reciprocation stroke of the discharge rod 36. Thus, the amount of the grease "G" to be supplied to the control flow path 33 is decided by the forward movement stroke of the driving rod 42. Therefore, the amount of the grease "G" to be supplied by the discharge rod 36 can be adjusted by adjusting the axial position of the stroke adjusting member 53 with respect to the driving case 37.

In the foregoing, the invention made by the inventors of the present invention has been concretely described based on the embodiments. However, it is needless to say that the present invention is not limited to the foregoing embodiments and various modifications and alterations can be made within the scope of the present invention.

What is claimed is:

1. A method of guiding fluid material to dispenser by using a discharge control apparatus for discharging the fluid material to the dispenser, the discharge control apparatus comprising:
    a cylindrical injection side portion having an injection chamber to which the fluid material pressurized by a compressed air is supplied, and having a cylindrical inner surface forming an outer valve seating surface which is continuous from the injection chamber;
    a storage container which communicates with the injection chamber, the fluid material being accommodated in the storage container;
    a partition member which is cylindrical and arranged on the inside of the outer valve seating surface in a radial direction so as to face with the outer valve seating surface, and partitions an internal space into a discharge chamber formed on the inside of the partition member and an annular feed chamber formed on the outside of the partition member;
    an inner valve seating surface provided to the tip end of the partition member, wherein a valve chamber is formed between the inner valve seating surface and the outer valve seating surface;
    a discharge control block formed with a control flow path which is connected to the feed chamber, wherein the volume of the control flow path is changed by a discharge rod;
    discharging means provided to the discharge control block to reciprocate the discharge rod; and
    a valve element having a base portion which is arranged in the valve chamber, and opens and closes an inner flow path formed between the inner valve seating surface and the base portion of the valve element, and an annular flange portion which is integrally formed with the base portion, and opens and closes an outer flow path formed between the annular flange portion and the outer valve seating surface with elastic deformation,
    wherein the flow path switching valve has:
        a first state in which the valve element contacts with the inner valve seating surface, and the annular flange portion abuts on the outer valve seating surface;
        a second state in which the valve element abuts on the inner valve seating surface, and the annular flange portion is separated from the outer valve seating surface; and
        a third state in which the valve element is separated from the inner valve seating surface, and the annular flange portion abuts on the outer valve seating surface,
        when the discharge rod is moved back, the valve element is put into the second state, and the flow path switching valve performs a filling operation to allow the fluid material to flow into the control flow path from the injection chamber,
        when the discharge rod is moved in a forward direction so as to increase the pressure in the feed chamber, the valve element is put into the third state, and the flow path switching valve performs a discharge operation to allow the fluid material to flow into the discharge chamber from the control flow path, thereby discharging the fluid material via a discharge port; and
        after the discharge operation, the fluid material is filled in the control flow path by moving the discharge rod to a backward position, and the valve element shifts into the first state with the fluid material filled in the control flow path,
    the compressed air is continuously applied to the storage container when the flow path switching valve performs the discharge operation and the filling operation, and used to supply the pressurized fluid material to the injection chamber from the storage container,
    the method comprising:
        a supply step of putting the valve element into the third state by moving the discharge rod in the forward direction, and supplying the fluid material to the discharge nozzle chamber, and
        a filling step of putting the valve element into the second state by moving the discharge rod to the backward position by a pressure force of the fluid material; and a balance step of putting the valve element into the first state by an elastic force of the flange portion after moving the discharge rod to the backward position.

* * * * *

UNITED STATES PATENT AND TRADEMARK OFFICE
CERTIFICATE OF CORRECTION

| | | |
|---|---|---|
| PATENT NO. | : 9,133,943 B2 | Page 1 of 1 |
| APPLICATION NO. | : 13/602806 | |
| DATED | : September 15, 2015 | |
| INVENTOR(S) | : Yuta Ohmura et al. | |

It is certified that error appears in the above-identified patent and that said Letters Patent is hereby corrected as shown below:

Claims

In Claim 1, Column 10, line 64; after "charge" delete "nozzle"

Signed and Sealed this
Eighth Day of March, 2016

Michelle K. Lee
*Director of the United States Patent and Trademark Office*